United States Patent [19]

Apostolos

[11] Patent Number: 4,623,289

[45] Date of Patent: Nov. 18, 1986

[54] SAFETY RETAINER FOR A WHEELCHAIR

[75] Inventor: John A. Apostolos, Sacramento, Calif.

[73] Assignee: State of California, Department of Transportation, Sacramento, Calif.

[21] Appl. No.: 673,330

[22] Filed: Nov. 20, 1984

[51] Int. Cl.[4] .......................... B60N 1/02; B60P 3/06

[52] U.S. Cl. .......................................... 410/7; 410/51; 280/289 WC; 296/65 R; 297/DIG. 4

[58] Field of Search ................ 188/2 F; 280/289 WC; 296/63, 65 R; 297/DIG. 4; 410/2, 3, 4, 7, 51; 414/921

[56] References Cited

U.S. PATENT DOCUMENTS

| | | | |
|---|---|---|---|
| 1,835,840 | 12/1931 | Barclay | 296/65 R |
| 2,101,210 | 12/1937 | Barclay | 296/65 R |
| 3,955,847 | 5/1976 | Schiowitz | 296/65 R |
| 4,019,752 | 4/1977 | Leon et al. | 296/65 R X |
| 4,027,747 | 6/1977 | Moorman, Jr. | 410/3 X |
| 4,060,271 | 11/1977 | Williams | 296/65 R |
| 4,076,268 | 2/1978 | Hart | 296/65 R X |
| 4,083,594 | 4/1978 | Tullock | 410/4 X |
| 4,093,303 | 6/1978 | Nelson | 296/65 R |
| 4,103,934 | 8/1978 | Arnholt et al. | 410/7 X |
| 4,246,984 | 1/1981 | Seay et al. | 188/2 F |
| 4,265,478 | 5/1981 | Korsgaard | 296/65 R |
| 4,325,576 | 4/1982 | Guthrie | 296/65 R |
| 4,369,995 | 1/1983 | Harder, Jr. | 296/65 R |
| 4,389,056 | 6/1983 | Tenniswood | 280/289 WC |
| 4,407,616 | 10/1983 | Hinze | 410/3 |
| 4,475,762 | 10/1984 | Delong et al. | 410/51 X |

FOREIGN PATENT DOCUMENTS

| | | | |
|---|---|---|---|
| 4229 | 1/1980 | Japan | 410/7 |

*Primary Examiner*—Robert B. Reeves
*Assistant Examiner*—David F. Hubbuch
*Attorney, Agent, or Firm*—Lothrop & West

[57] ABSTRACT

A device for holding a wheelchair stationary on a floor has a pair of notched plates at their rearward ends adapted to abut a transverse barrier upstanding from the floor and to be releasably engaged at their forward ends by a bail fastened to and swinging from the floor to engage the forward ends of the notched plates with sufficient resilient force to lock the wheelchair in position.

8 Claims, 5 Drawing Figures

SAFETY RETAINER FOR A WHEELCHAIR

BACKGROUND OF THE INVENTION

A search revealed a number of prior art patents concerned with holding wheelchairs in fixed positions for various reasons and in various environments. These patents are listed below and a copy of each is enclosed.

| | | |
|---|---|---|
| Barclay | 1,835,840 | 12/31 |
| Barclay | 2,101,210 | 12/37 |
| Schiowitz | 3,955,847 | 5/76 |
| Leon et al | 4,019,752 | 4/77 |
| Moorman, Jr. | 4,027,747 | 6/77 |
| Williams | 4,060,271 | 11/77 |
| Hart | 4,076,268 | 2/78 |
| Tulloch | 4,083,594 | 4/78 |
| Nelson | 4,093,303 | 6/78 |
| Arnholt et al | 4,103,934 | 8/78 |
| Seay et al | 4,246,984 | 1/81 |
| Korsgaard | 4,265,478 | 5/81 |
| Guthrie | 4,325,576 | 4/82 |
| Harder, Jr. | 4,369,995 | 1/83 |
| Tenniswood | 4,389,056 | 6/83 |
| Hinze | 4,407,616 | 10/83 |

None of these patents is specifically conerned with the disclosure herein.

SUMMARY OF THE INVENTION

For firmly and releasably holding a wheelchair in a predetermined position on a floor; say, the floor of a bus, longitudinally extending transversely spaced plates on the wheelchair are, at their rearward ends, abutted against a transverse backstop upstanding from the floor of the bus. At their forward ends the plates are engaged by a transverse bail rod controlled to swing upwardly and rearwardly from a position near the floor and away from the backstop into a position to engage notches in the forward ends of the plates. The bail rod engages the notches with a force sufficient to prevent any substantial motion of the wheelchair on the floor.

DETAILED DESCRIPTION

Figure 1:
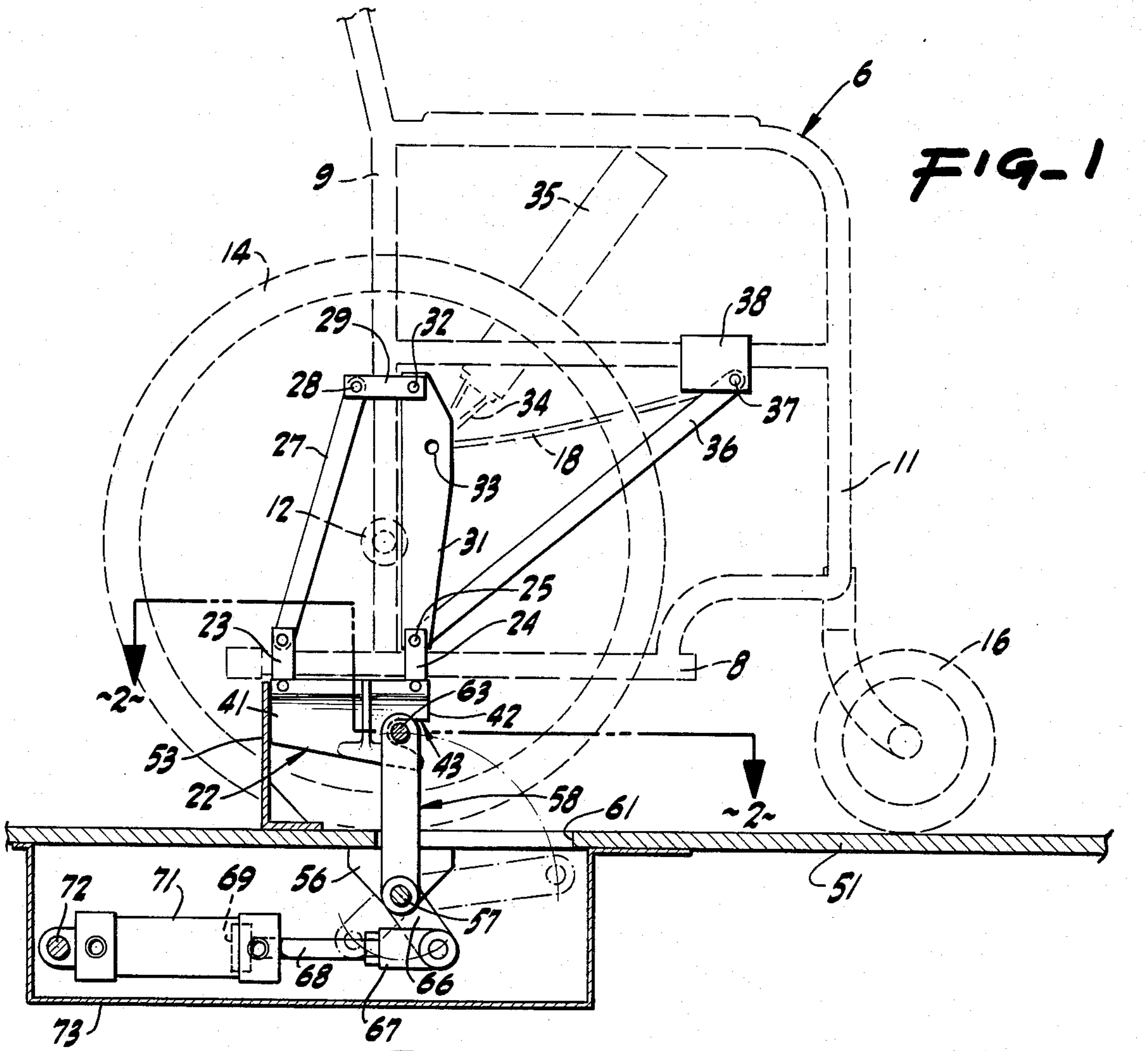
FIG. 1 is a cross-section on a vertical longitudinal plane through a device as disclosed herein, the wheelchair being shown in broken lines and with a near wheel removed. The remaining part of the structure is shown partly in cross-section.
Figure 2:
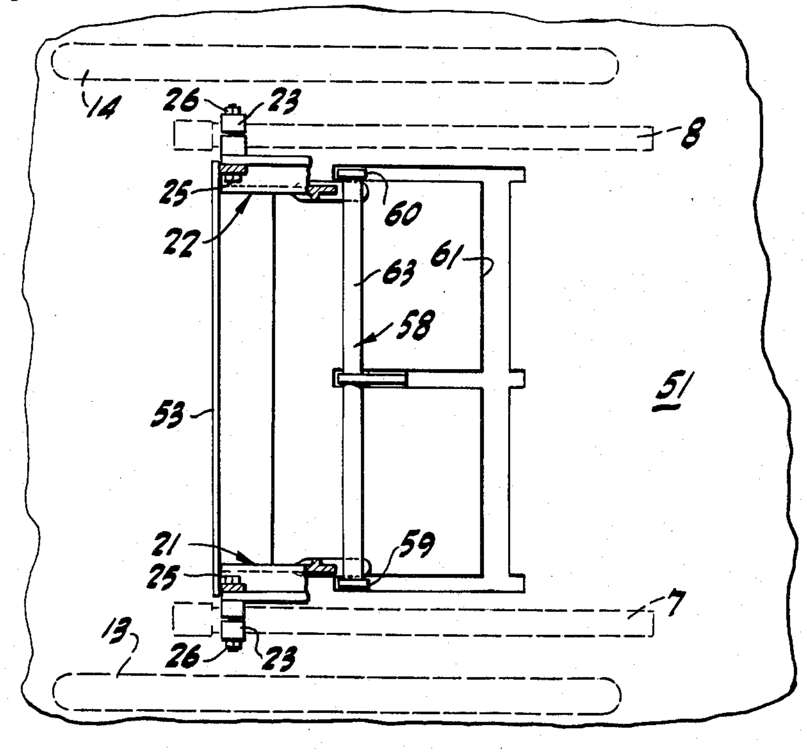
FIG. 2 is a cross-section of some of the structure shown in FIG. 1, the plane of section being indicated by the line 2—2 of FIG. 1.

The problem addressed by the present disclosure is well and safely to secure a wheelchair of a relatively standard nature inside a vehicle such as a bus. While wheelchairs vary in construction, in general they all involve some sort of a frame, usually a tubular frame, and include a backrest portion, a seat portion, and a footrest portion all supported on an axle engaged by a pair of relatively large wheels preceded by a pair of relatively small wheels.

In the present instance and utilized primarily as an example, there is a wheelchair frame 6 inclusive of a number of tubular members, particularly a pair of longitudinally extending bottom tubes 7 and 8 disposed longitudinally and parallel to each other in a transversely spaced-apart orientation. Joined to such tubes 7 and 8 are pairs of upright members 9 toward the rear and upright members 11 toward the front. The members 9 are spanned by an axle 12 journalling a pair of large, ground-engaging wheels 13 and 14 at its opposite ends. The forward frame receives a pair of swivel wheels 16. There is a seat 18, preferably of a fabric nature, suspended between the side tubes of the wheelchair. There may be other accoutrements such as armrests, a back support and a foot rest and the like in accordance with the variations in normal wheelchair design. The wheelchair itself is not part of the present structure except as it is modified.

Part of the modification to a standard wheelchair is the provision of a pair of plates 21 and 22 extending generally in a vertical plate and longitudinally with respect to the chair. The plates themselves are approximately planar for the most part, but are incurved along the top to be appropriately situated with respect to the bottom frame tubes 7 and 8. The plates are preferably secured to the lower tubes by clamps 23 and 24, preferably made in two parts, and secured together by fasteners such as bolts 25 and nuts 26. The plates are thus disposed in the desired fore and aft location along the tubes 7 and 8 in a generally parallel condition.

Upstanding from the clamps 23 and 24 is a pair of rear braces 27 at one end secured by the fastenings 25 and at the other end connected by fastenings 28 to a horizontal pair of clamps 29 on upright frame tubes. To serve as additional bracing there are upstanding struts 31 at the lower end secured by fasteners for the clamps 24 and at the upper end secured by appropriate clamp fastenings 32 on the wheelchair frame. In the struts 31 there are apertures 33 designed to receive clips 34 at the ends of a seat belt 35 which extends over the seat 18.

It is especially to be noted that any upward force components imposed on the seat belt are directly resisted by the vertical struts 31, clamps 24, and plates 21 and 22, which are, in turn secured by the safety retainer of the invention.

In addition, there are diagonal reenforcing struts 36 at the lower end connected to an adjacent one of the fastening bolts 25, with the upper end connected by a fastening and clamp bolt 37 to a clamp 38 surrounding the adjacent tube of the wheelchair 6. This structure assures that the plates 21 and 22 are held very firmly with respect to the main frame of the wheelchair and against any dislodgement by even extreme forces which might ever be expected to be imposed thereupon.

Each of the plates 21 and 22 at its rear edge is terminated in a vertical margin 41. At its forward edge each plate 21 and 22 has a partial vertical margin 42, but also has a reentrant slot 43. This slot has generally horizontal margins, the lower one curving forwardly and downwardly to an inclined boundary 46 of the slot.

The main wheels 13 and 14 of the wheelchair are designed to rest on the floor 51 of a bus or comparable vehicle, for example. The floor is of considerable strength and is able firmly to support a transversely extending, upright backstop 53 permanently braced and secured to the floor and extending vertically to a predetermined height approximately the same as the vertical height of the plates 21 and 22. The transverse extent of the backstop is sufficient so that it can be abutted by both of the plates 21 and 22 at once, yet terminates well within the tread of the wheels 13 and 14.

Particularly in accordance with the invention, the floor 51 has mountings 56 serving as journals to receive a cross shaft 57 forming part of a bail 58. This is inclusive of a couple of upright levers 59 and 60 at the opposite ends of the shaft 57. The bail 58 is adapted to rotate through approximately ninety degrees from a position indicated by the broken line in FIG. 1 below the floor 51 and through a multiple slot 61 cut in the floor. The bail can assume an upper position with a cross rod 63 of the bail lying within the slots 43.

In addition to the end levers, there is preferably provided a central lever 66 extending from and secured to the cross shaft 57 and engaged by a pin to a yoke 67 at the forward end of a piston rod 68. The piston rod 68 joins a piston 69 reciprocable within a cylinder 71 having a pivot connection 72 to a housing 73 secured to the bottom of the floor 51.

Preferably the piston is maneuvered in the cylinder by means of compressed air, the air being derived from any suitable source, conveniently the supply of compressed air normally available on the bus. For that reason, the ends of the cylinder are connected by flexible conduits 81 and 82 to a standard control valve 83 connected to exhaust at 84 and to the supply 85 of air under pressure. The valve itself is controlled by energizing solenoids 86 and 87 in a circuit having conductors 88 and 89 going to a battery 91, preferably the bus battery. There is a driver's control switch 92 having a lead 93 going to the solenoid 86 used for securing the wheelchair in position and having a lead 94 going to the solenoid 87 for releasing the wheelchair. The switch 92 also has a conductor 96 going to a user's switch 97 so that by placing the switch 92 in central position, the driver may give control to the user. The user's control switch 97 is situated near the wheelchair. In one position, this switch 97 is joined to the lead 94 for release and in another position is joined to the lead 93 for securing the wheelchair.

With this arrangement and with the standard wheelchair adapted and augmented as shown, the wheelchair is moved from some remote position over the floor 51 of the bus into a location approximately as shown in FIG. 1. The wheelchair is backed so that the near ends of both of the side plates 21 and 22 come into or close to abutment with the backstop 53. When this position has been attained or approximately attained, the bus driver or wheelchair user operates either the control switch 92 or the control switch 97 and so operates the solenoid 86 to supply compressed air to the left-hand end of the cylinder 71. This expels the piston 69 and rocks the shaft 57 in a counterclockwise direction, in FIG. 1, thus moving the bail 58 from a position beneath the bus floor and out of the way of movement of the wheelchair into an upper position with the bail rod 63 entering into and in effect nearly or actually wedging itself into the slot 43.

In the final part of this movement of the bail, the force is such, if necessary, as to move the wheelchair rearwardly to cause the plates to be in firm end abutment with the backstop 53 or barrier. The bail rod 63 may cam against the curved bottom of the slot 43 and produce a downward force on the wheelchair. The piston rod extends almost completely to the right under the resilient pressure of the comprssed air in the cylinder. That presses the wheelchair firmly in position against any fore and aft or longitudinal movement. Since the bail is well within the slots, any vertical movement is prevented, as well. In addition, the levers 59 and 60 are close to or substantially against the sides of the plates 21 and 22 so that transverse displacement is likewise restricted.

With the parts in this position the wheelchair is firmly clamped or held or secured in its predetermined position on the bus floor and against dislodgement in longitudinal, transverse and vertical directions.

When the wheelchair is to be released, the control switch 92 or the switch 97 is moved into the proper extreme position. This energized the solenoid 87 while deenergizing the solenoid 86, reverses the valve 83 and causes compressed air to be released from the left end of the cylinder, as seen in FIG. 1, and compressed air to be introduced into the right end of the cylinder. The bail is thus rotated positively in a clockwise direction, as seen in FIG. 1, removing the bail rod 63 from the two slots 43 and removing the levers 59 and 60 from the sides of the plates 21 and 22. The bail 58 is rotated far enough so that it passes through the slot 61 and is below the floor of the bus. Under these conditions, the wheelchair can be manually moved forward from its blocked position and is ready for general use.

Figure 3:
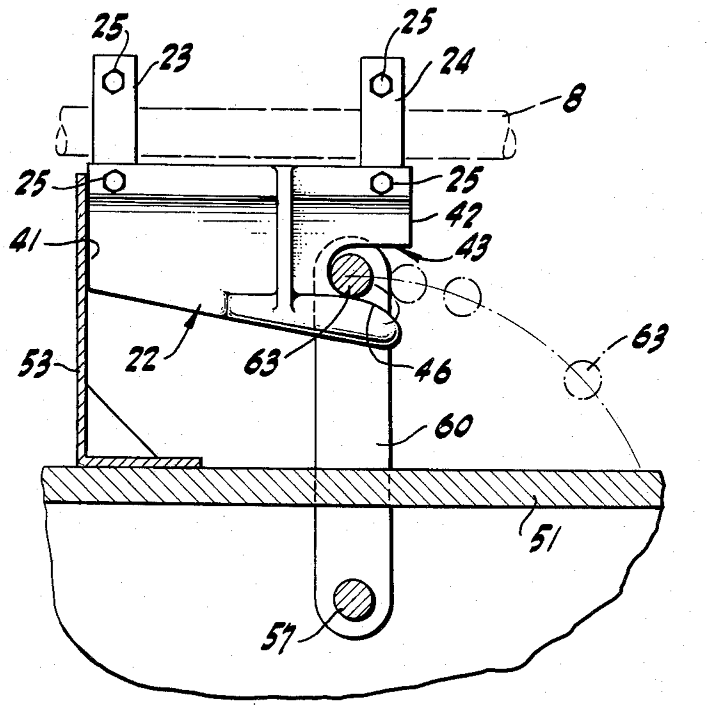
FIG. 3 is an enlarged view of the interengaging portions of the wheelchair plates and of the restraining device.
Figure 4:
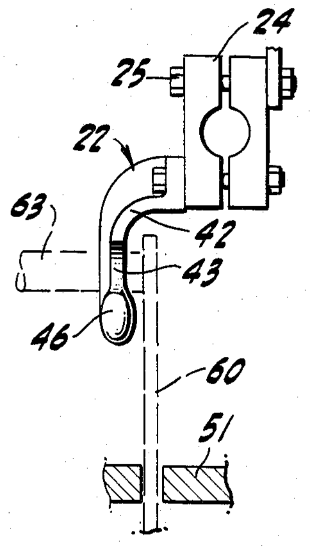
FIG. 4 is a detailed elevation of the structure shown in FIG. 3.
Figure 5:
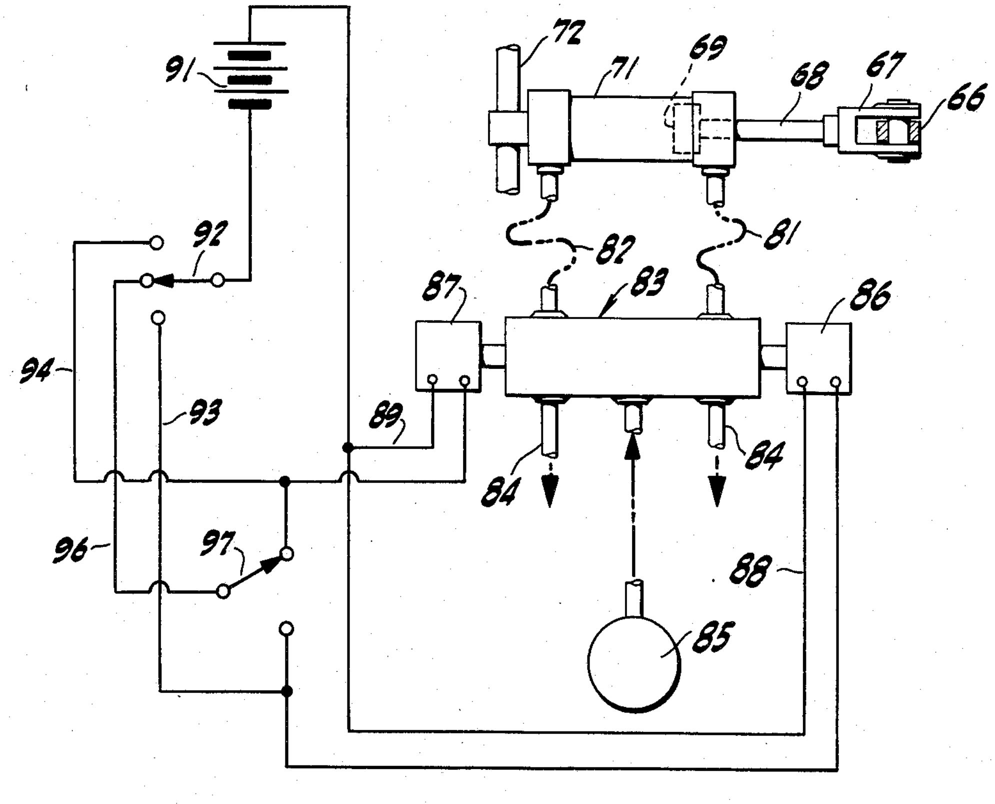
FIG. 5 is a diagram showing the power structure and its control circuitry.

In the event that the bus were to become involved in an accident which resulted in the rupture of the hose from the air supply 85, any forward inertia possessed by the wheelchair and its occupant tends to urge the cross-rod 63 and associated levers 59 and 60 forwardly and downwardly in the path of the arcuate broken line shown in FIG. 3. However, owing to the shape and extent of the inclined boundary 46 forming the lower, forwardly and downwardly curving margin of the slot 43, the cross-rod 63 continues to be underlain by the boundary 46 until the cross-rod reaches the position indicated by the broken line circle second to the right of the cross-section 63 shown in FIG. 3. At this juncture, the forward portion of the curved boundary 46 comes into upwardly camming engagement with the bottom of the cross-rod 63. Thus, the cross-rod 63 can no longer swing downwardly and forwardly in the arc defined by the length of the levers 59 and 60 and further forward motion of the wheelchair is halted.

It can therefore be seen that even in the event of an interrupted air supply (in case of an accident, for example) the wheelchair and its seat-belted occupant are safely restrained and prevented from being thrust against a forwardly located object or person. Yet, release of the wheelchair can readily be effected thereafter by backing the wheelchair until the forward portion of the boundary wall 46 is clear of the cross-rod 63, at which juncture the bail can manually be swung forwardly and downwardly out of the way so that the wheelchair is ready for general use.

What is claimed is:

1. A safety retainer for a wheelchair having a frame and adapted to be disposed in a predetermined transverse and longitudinal position on a floor comprising a plate mounted on said frame to extend in a longitudinal direction and having an upstanding rear edge at a rearward end and having a forwardly open slot in an upstanding front edge at a forward end, a backstop secured to and upstanding from said floor in a location to engage said rear edge, a bail mounted on said floor for movement between a retracted position below said floor and an erected position interengaging said slot, and means for moving said bail between said retracted position and said erected position.

2. A safety retainer for a wheelchair having a frame and adapted to be disposed in a predetermined transverse and longitudinal position on a floor comprising a plate mounted longitudinally on said frame and having a rearward edge and having a forward edge contoured to define a slot, a backstop secured to and upstanding from said floor in a location to engage said rearward edge when said wheelchair is in said predetermined position, a bail mounted on said floor for movement between a retracted position out of engagement with said slot when said wheelchair is in said predetermined position and an erected position interengaging said slot when said wheelchair is in said predetermined position, and means for moving said bail between said retracted position and said erected position.

3. A device as in claim 2 including a pair of said plates mounted on said frame with said slots in transverse alignment, and means included in said bail for simultaneously interengaging both of said slots when said bail is in said erected position.

4. A safety retainer for a wheelchair having a frame and adapted to be disposed in a predetermined transverse and longitudinal position on a floor comprising a pair of plates each having a rearward edge and a forward edge, each of said forward edges having a forwardly open slot therein, means for clamping said plates on said frame in transverse alignment and parallel to each other, stop means secured relative to said floor adapted to abut said rearward edge of each of said plates when said wheelchair is in said predetermined position, and means secured relative to said floor and adapted to swing into and out of interengagement with said slots when said wheelchair is in said predetermined position with said rearward edge of each of said plates against said stop means.

5. A device as in claim 4 in which said stop means is a plate stationary with respect to and upstanding form said floor.

6. A device as in claim 4 in which said means adapted to swing includes a bail having a transversely extending rod, a pair of parallel levers engaging said rod, and means for mounting said levers on said floor for rotation about a transverse axis parallel to said rod.

7. A device as in claim 6 in which said mounting means includes a shaft, and journals on and below said floor and supporting said shaft.

8. A safety retainer for a wheelchair having a frame and adapted to be disposed in a predetermined transverse and longitudinal position on a floor comprising a pair of longitudinally extending plates secured to opposite sides of said frame and having rearward ends disposed in a common transverse plane substantially at said predetermined location and said plates having forward ends disposed in another common transverse plane and having horizontally forwardly open slots therein, transversely extending stationary means secured to and upstanding from said floor, a bail including a transversely extending rod, means for mounting said bail on said floor for swinging movement between one position with said rod adjacent said floor and another position with said rod in said forwardly open slots, and means for moving said bail from said one position into said other position in engagement with said plates and for urging said plates into abutment with said stationary means.

* * * * *